Aug. 8, 1961                J. LOCKWOOD                 2,995,151
                            RADIATOR HOSE
                         Filed Jan. 30, 1959
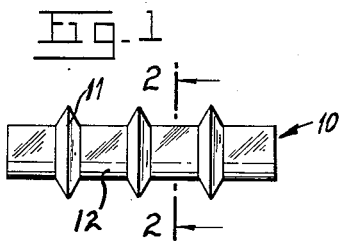
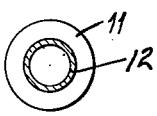
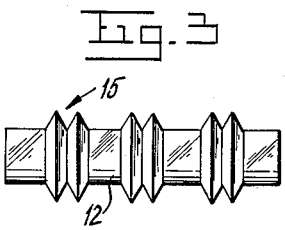
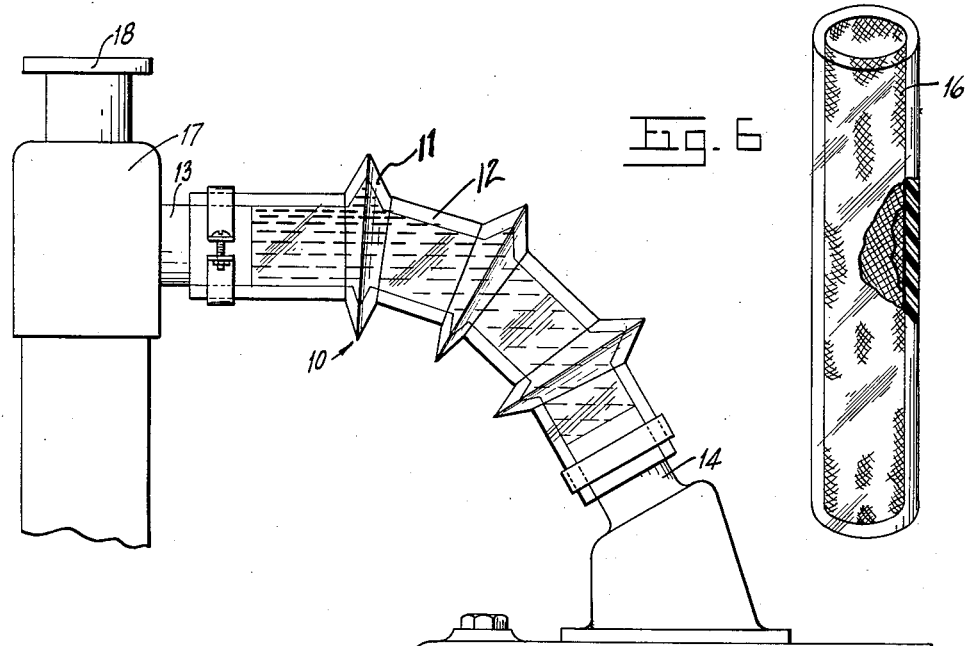
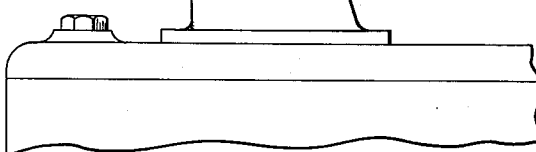
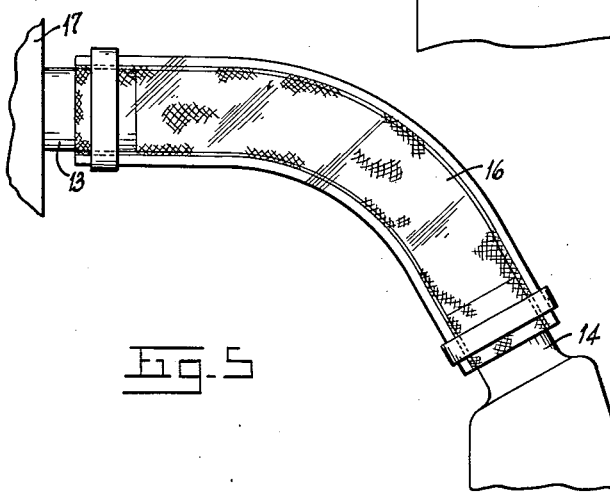
INVENTOR.
JACK LOCKWOOD
BY Frank Mahone
ATTORNEY

United States Patent Office 2,995,151
Patented Aug. 8, 1961

2,995,151
RADIATOR HOSE
Jack Lockwood, Richmond Road, Staten Island, N.Y.
Filed Jan. 30, 1959, Ser. No. 790,153
1 Claim. (Cl. 138—121)

This invention relates to radiator hoses for automobiles.

The conventional opaque black flexible rubber hose used in automobiles does not permit seeing if the radiator needs water. Accordingly it is necessary for a person to remove the cap to see if the radiator needs water. This procedure may result in persons scalding themselves with hot water when the cap is removed as the cap is under water vapor pressure.

It is an object of this invention to provide a transparent radiator hose adapted to permit viewing of the water level in the radiator.

This and other objects of this invention will become apparent upon reading the following descriptive disclosure taken in conjunction with the accompanying drawing in which:

FIG. 1 is a side view of the single flute modification of this invention,

FIG. 2 is a section view taken on line 2—2 of the FIG. 1 modification,

FIG. 3 is a side elevation view of a plural flute modification,

FIG. 4 is a side view of a portion of transparent single flute tubing bent to assume the curved distance between the radiator inlet nozzle and the water pump outlet, FIG. 5 is a cross-section view of a translucent non-fluted polyethylene pipe molded to fit the curved distance between an automobile radiator and the water pump, and FIG. 6 is a front view of a polyvinyl transparent pipe having embedded therein a woven glass hose.

Turning to the drawing the pipe of this invention is uniformly thick and is preferably flexible so that it can assume a right angle bend of small radius. To this end a modification of this invention uses fluted pipe having flute sections of one or more flutes alternately disposed to suitable linear non-fluted sections adapted to be inserted upon a pipe. These linear sections are of a length so that when transversely cut in the middle, a pair of insertable pipe ends are produced (FIG. 1).

Preferably the pipe is transparent and made of flexible transparent polyvinyl chloride plastic of suitable thickness to withstand pressure. The plastic may comprise a woven glass center core embedded during the process of manufacture centrally within an annular transparent plastic pipe. The woven glass hose or core gives strength to the plastic and being of clear glass it is transparent.

Turning now to the drawing, a pipe 10 made of transparent or translucent plastic for example, polyvinyl chloride or polyethylene is preferably provided with a woven embedded core (FIG. 6).

Although long flexible non-fluted pipe may be cut up as needed to obtain individual hose pieces, it is preferable to mold the non-fluted radiator pipes into single units each having a suitable angular bend.

A preferred radiator hose is shown in FIGS. 1 and 2 wherein the linear hose is provided with single or multiple flute sections alternately disposed with suitably long non-fluted sections.

The single flute 11 of the hose 10 of FIG. 1 is provided with a suitable bellows flute 11 to permit the hose to assume a substantially right angle bend by a squeezing effect of individual bellows at their depending or bottom portion. The hose 10 is made of continuous length and is cut as needed in the middle of the non-fluted sections 12 to yield two insertable portions, insertable in a radiator nozzle 13 or a water pump nozzle 14.

As shown in FIG. 3, the hose may have a multiple flute section 15 made up of two or more contiguous flutes or bellows.

The hose is preferably provided with an embedded woven glass core 16 (FIGS. 5 and 6) both in the fluted and non-fluted modifications.

As shown in FIG. 4, the water level of the water in the radiator 17 is visible in the hose 10 so that its height is always known without need for removal of the radiator cap 18.

This invention is of broad scope and hence is not limited to these illustrative embodiments.

I claim:

A transparent flexible continuous hose having a uniformly thick wall and adapted for use with automobile radiators consisting essentially of a plurality of alternate circular single flute segments of a larger diameter than the main portion of said hose integral with interiorly smooth walled cylindrical segments of smaller diameter, said smooth walled segments being adapted to be cut in the center thereof for formation of cylindrical portions suitable for fitting onto radiator nozzles, said hose consisting of a transparent woven glass tubular element embedded in a transparent flexible plastic element whereby bending of said hose causes inward compression of said uniformly thick walled flutes at the inside of the bend with outward expansion of said flutes at the outside of the bend thereby effecting bending of said hose through simultaneous compression and expansion of respective parts of the flutes therein.

References Cited in the file of this patent
UNITED STATES PATENTS

| | | |
|---|---|---|
| 2,409,430 | Greenleaf | Oct. 15, 1946 |
| 2,449,265 | Williams | Sept. 14, 1948 |
| 2,468,493 | Greenwald | Apr. 26, 1949 |
| 2,503,934 | Church | Apr. 11, 1950 |
| 2,622,623 | Michaudet | Dec. 23, 1952 |
| 2,624,366 | Pugh | Jan. 6, 1953 |
| 2,703,109 | Saville | Mar. 1, 1955 |
| 2,864,591 | Frink | Dec. 16, 1958 |
| 2,870,619 | Greczin | Jan. 19, 1959 |
| 2,897,839 | Roberts et al. | Aug. 4, 1959 |